US006826548B2

(12) United States Patent
Hungerpiller et al.

(10) Patent No.: US 6,826,548 B2
(45) Date of Patent: Nov. 30, 2004

(54) SYSTEM AND METHOD FOR PROCESSING RETURNED MAIL

(75) Inventors: Ralph Mitchell Hungerpiller, Birmingham, AL (US); Ronald C. Cagle, Birmingham, AL (US)

(73) Assignee: Return Mail, Inc., Birmingham, AL (US)

( * ) Notice: Subject to any disclaimer, the term of this patent is extended or adjusted under 35 U.S.C. 154(b) by 142 days.

(21) Appl. No.: 10/057,608

(22) Filed: Jan. 24, 2002

(65) Prior Publication Data

US 2003/0191651 A1 Oct. 9, 2003

Related U.S. Application Data

(60) Provisional application No. 60/263,788, filed on Jan. 24, 2001.

(51) Int. Cl.$^7$ .............................................. G07B 17/00
(52) U.S. Cl. ...................................... 705/401; 382/101
(58) Field of Search ................................ 382/100, 101, 382/102, 112; 705/401, 408, 410

(56) References Cited

U.S. PATENT DOCUMENTS

| | | | |
|---|---|---|---|
| 4,800,505 A | 1/1989 | Axelrod et al. ............. 364/478 |
| 4,979,605 A | 12/1990 | Svyatsky .................... 198/349 |
| 5,229,932 A | 7/1993 | Connell et al. ............. 364/401 |
| 5,319,181 A | 6/1994 | Shelhammer et al. ....... 235/462 |
| 5,420,403 A | 5/1995 | Allum et al. ................ 235/375 |
| 5,422,821 A | 6/1995 | Allen et al. ................. 364/478 |
| 5,514,863 A | 5/1996 | Williams .................... 235/494 |
| 5,770,841 A | * 6/1998 | Moed et al. ................ 235/375 |
| 5,925,864 A | * 7/1999 | Sansone et al. ............. 235/375 |
| 5,953,427 A | 9/1999 | Cordery et al. ............... 380/51 |
| 6,032,138 A | 2/2000 | McFiggans et al. ........ 705/410 |
| 6,055,520 A | 4/2000 | Heiden et al. .............. 705/410 |
| 6,125,357 A | 9/2000 | Pintsov ....................... 705/408 |
| 6,175,827 B1 | 1/2001 | Cordery et al. ............. 705/410 |
| 6,178,411 B1 | 1/2001 | Reiter ......................... 705/408 |
| 6,178,412 B1 | 1/2001 | Ratzenberger, Jr. et al. 705/408 |
| 6,253,219 B1 | 6/2001 | Gardner et al. ............. 707/530 |
| 6,292,709 B1 | * 9/2001 | Uhl et al. .................... 700/226 |
| 6,370,446 B1 | 4/2002 | Divine ........................ 700/226 |
| 6,385,504 B1 | 5/2002 | Pintsov et al. .............. 700/226 |
| 6,549,892 B1 | * 4/2003 | Sansone ...................... 705/401 |
| 2001/0010334 A1 | 8/2001 | Park et al. .............. 235/462.14 |
| 2002/0029202 A1 | 3/2002 | Lopez ......................... 705/406 |
| 2002/0147731 A1 | 10/2002 | Seestrom et al. ......... 707/104.1 |

FOREIGN PATENT DOCUMENTS

| | | | | |
|---|---|---|---|---|
| EP | 1022691 A2 | 7/2000 | ........... G07B/17/00 |
| JP | 07-171505 | * 7/1995 | |
| JP | 2000334389 A | 12/2000 | ............. B07C/3/18 |
| WO | WO/ 00/10113 | 2/2000 | ............. G06K/9/00 |

OTHER PUBLICATIONS

Business Wire: "Pitney Bowes: Pitney Bowes ADDRESS-RIGHT system allows companies to make best impression and save money through the mail"; May 1, 1992.*

* cited by examiner

*Primary Examiner*—Edward R. Cosimano
(74) *Attorney, Agent, or Firm*—Womble Carlyle Sandridge & Rice, PLLC (57) ABSTRACT

A method, system and program product for processing returned mail includes the steps of encoding pieces of mail with data including the identity of the intended recipient, mailing the pieces of mail to the intended recipients, collecting at a processing location those pieces of mail that are returned as undeliverable, scanning the data from the returned pieces of mail, electronically updating at least address information for the intended recipients of the returned mail, and electronically transmitting the updated address and other information to a subscriber for updating the subscriber's database of recipient addresses.

38 Claims, 5 Drawing Sheets

SYSTEM AND METHOD FOR PROCESSING RETURNED MAIL

CROSS-REFERENCE TO RELATED APPLICATIONS

The present patent application is a formalization of a previously filed, co-pending provisional patent application entitled "Method of Processing Returned Mail", filed Jan. 24, 2001, as U.S. Patent Application Serial No. 60/263,788 by the inventors named in this patent application. This patent application claims the benefit of the filing date of the cited provisional patent application according to the statutes and rules governing provisional patent applications, particularly USC § 119(e)(1) and 37 CFR §§ 1.789(a)(4) and (a)(5). The specification and drawings of the provisional patent application are specifically incorporated herein by reference.

BACKGROUND OF THE INVENTION

The present invention relates generally to mail processing, and more particularly to a method, system, and program product for processing business mail that is returned to the sender due to an inaccurate or expired address for the intended recipient.

Many businesses mail thousands or even millions of pieces of mail each month to customers, clients, and prospects. Such businesses include, for example, insurance companies, mortgage and finance companies, bulk mail advertisers, and credit card companies. Inevitably, a certain percentage of the items that are mailed each month by these businesses are returned to the sender, usually because the intended recipient has moved without notice or otherwise is no longer at the address to which the mail was sent. Other causes, such as incomplete addresses and local changes in addresses of residences in an area also may result in returned mail. Intended recipients also can change their names through marriage or otherwise, which also can result in returned mail.

The processing of mail that is returned to sender historically has been a time-consuming labor-intensive process for high volume mail users. It is not uncommon for such high volume users to retain a staff of several employees whose job it is to receive the returned mail, manually research the reasons for the unsuccessful delivery, obtain, where possible, the correct addressing information for the intended recipient, and oversee a second mailing to the corrected address. Even with the availability of address updating services to aid in researching for the correct address, the process is substantially a manual one subject to human error and delays. Furthermore, the cost of maintaining a staff to handle returned mail, to update company address databases, and the postage expense that is incurred before the mail actually reaches the intended recipient is substantial. Finally, human error is always an issue with such manual systems.

Accordingly, a need exists for an improved method of processing returned mail that overcomes the historical problems with prior art manual handling and that does so quickly, more accurately, and at substantially less cost. It is to the provision of such a method and system that the present invention is primarily directed.

SUMMARY OF THE INVENTION

Successful performance of the invention as described herein depends upon the subscribers providing specification compliant mail for processing. In general terms this means that: (1) the physical properties (length, height, thickness, weight, etc.) of the mail to be processed conform to United States Postal Service (USPS) automation letter mail standards, modified to exclude post-cards and "self-mailers" and (2) the mail includes return address block information specially formatted as a two-dimensional barcode.

Subscribers provide the address of the return mail service provider in the return address block, which receives mail, returned as undeliverable by the USPS. The return mail provider service provider captures the data from the returned items and apply its special expertise in obtaining corrected address information. The return mail service provider then electronically transfers corrective data records to the subscriber.

In one exemplary embodiment, data including the identification of the addressee is encoded on each item of a subscriber's mail to be delivered. Items of mail found to be undeliverable subsequent to mailing are received at a processing location where they are loaded onto a transport mechanism and then optically scanned. The optically scanned data is stored in a data file for further processing. The names and addresses of the intended recipients in the data file are then transmitted to a service bureau electronically for updated addresses. Upon receiving updated addresses, the new address data is delivered to the subscriber in electronic form for us in updating the subscriber's customer address files.

DESCRIPTION OF THE DRAWINGS

The invention is better understood by reading the following detailed description of an exemplary embodiment in conjunction with the accompanying drawings.

DETAILED DESCRIPTION OF THE INVENTION

The present invention is directed to an improved method and system for processing returned mail that successfully addresses the problems with prior art methods. The methodology is offered to subscribers through a return mail processing service provider that can be centrally located or that can have regional locations. The return mail process is particularly applicable to high volume (bulk) mail users such as credit card companies, but is also applicable to any mail user who experiences and must deal with quantities of returned mail each month. The methodology of the process is described in the following.

Each piece of mail to be sent by a subscriber to its own customers is optically encoded on its face or back side with a block of machine-readable data in the form of a two-dimensional (2-D) barcode that can include a wide variety of information. This information can include the name and address of the addressee, identifying information regarding the sender, electronic mail address of the sender, and virtually any other information useful to include on the mail. In reality, a relatively large volume of information can be encoded in such optical data blocks. For example, information related to the address history of the addressee and similar data can be included.

Portable Data File 417 (PDF417) is the most widely used 2-D barcode. Developed by Symbol Technologies, Inc, this barcode can hold up to 1800 bytes of any digital data in a printed area the size of a business card. An optical scanner reads the barcode horizontally and vertically.

A subscriber, for example, a credit card company, also includes on each piece of mail, in addition to the optically encoded data, a written return address that is not the address of the subscriber but rather the address of the central, or one of the regional locations, of the service provider. Accordingly, when a piece of mail is undeliverable for any reason, it is returned by the post office to the return mail service provider offering the processing services of the present invention. As an alternative, a subscriber can elect to receive its own returned mail, bundle it together, and then deliver it to the return mail service provider for return mail processing. In any event, at the return mail service provider's location, thousands of pieces of undeliverable mail sent originally by many subscribers to their customers are received either directly from the post office or from subscribers.

Figure 1:
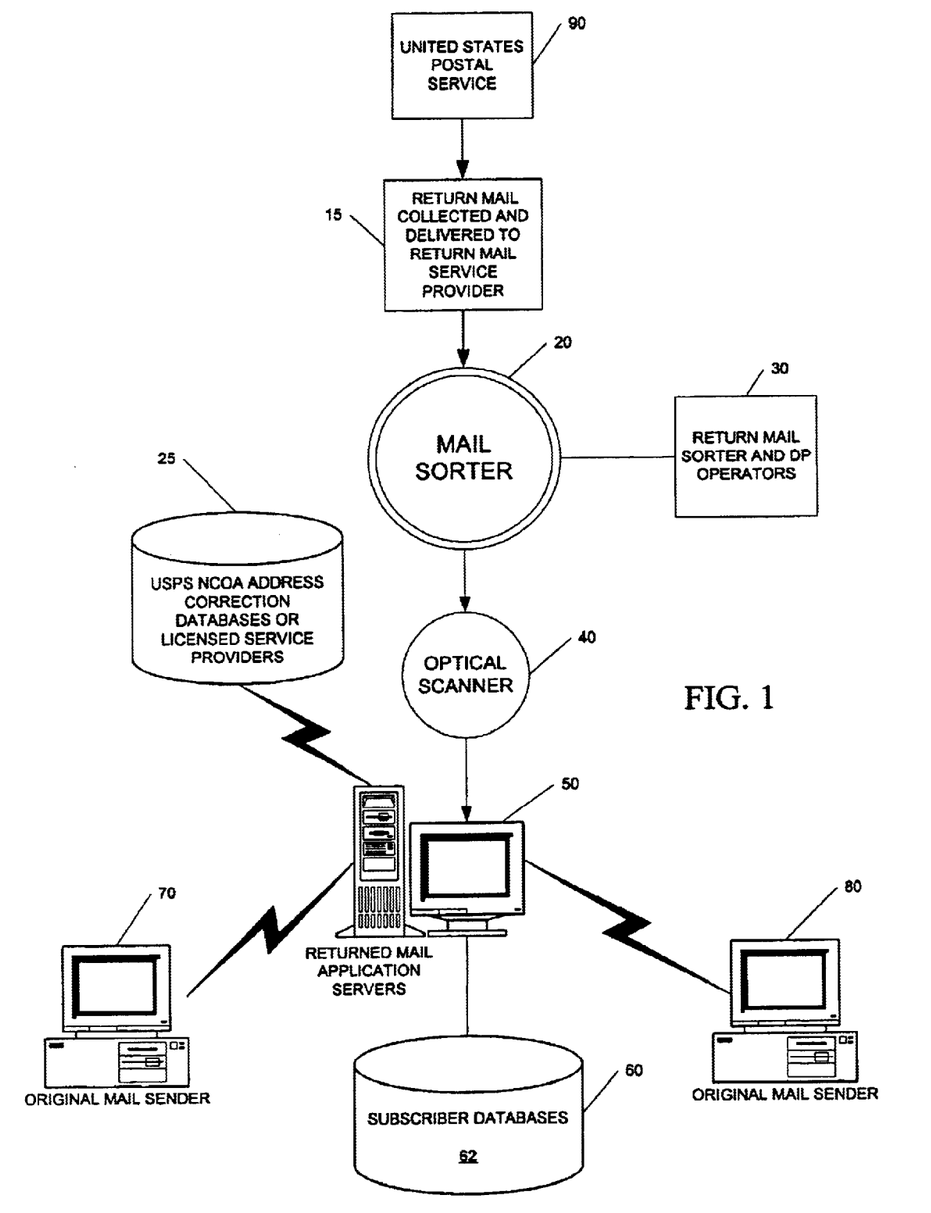
FIG. 1 illustrates the processing flow for the returned mail handling system in accordance with an exemplary embodiment of the present invention.

Referring to FIG. 1, at the return mail service provider's location, the returned mail (block 15) is received from the United States Postal Service (block 90) and passed through a high volume mail sorter 20 and optical scanner 40 by return mail sorter and data processing operators 30. The optical scanner 40 reads the information previously optically encoded onto each mail piece before it was sent. This information is conveyed to a computer based application server 50 programmed to store and process the scanned information according to the methodology of the invention. The scanned information is stored in the return mail service provider's mass storage device 60, containing a plurality of subscriber databases 62. The information scanned from the returned mail pieces may be processed in a number of ways by the return mail application server 50 depending upon the desired services to be provided. In one exemplary embodiment, the return mail application server 50 is programmed to sort the data in an appropriate way initially, for example, by subscriber. The addresses of the addressees may then be extracted from the scanned data for processing.

The return mail application server 50 preferably is electronically linked by a data line, which may be any conventional telecommunications data line, to the computers and databases 25 of an auxiliary address service that provides up-to-date addresses for millions of people throughout the country. These may be the same address services that historically have been accessed as a research source by the return mail handling staff of subscribers in manually updating addresses of returned mail. Software interfaces are provided on the address service's computers and database 25 and in the return mail application server 50 such that the two computers may exchange data and information electronically and automatically. In one embodiment, the application server 50 transmits to the address service's computer 25 the inaccurate and/or out-of-date address of the intended recipient of each piece of returned mail. In response, the address service provider's computer 25 returns to the return mail application server 50 the correct and up-to-date address of the intended recipient. Other information also can be accessed and downloaded such as, for example, data reflecting name changes of recipients due to marriage, or data reflecting other changes in status.

Once the updated data is downloaded from the address service's computer 25, the application server 50 creates a database 62 for each subscriber containing a variety of information regarding the returned pieces of mail. For instance, the database 62 clearly would contain the identity of the intended recipient and the new updated address retrieved from the address service's computer 25. Any other pertinent information also may be included such as name change information or even job or economic status changes that may be of interest or important to the subscriber.

Once the corrected up-to-date database 62 is created for the returned mail of a subscriber, (the return mail application server 50 establishes a data connection with a computer 70, 80 of the subscriber. The updated data files are then transferred electronically to the subscriber's computer 70, 80, which is provided with software to receive and interpret the data, to update the subscriber's mailing list with the new addresses contained-in the data, and to update the subscriber client or customer files to reflect any other information that may be transmitted with the data. The subscriber may use this updated information as it deems appropriate. For example, the subscriber's computer may be programmed to produce immediate re-mailings of the invoices or other mail that originally was returned by the post office as undeliverable. Alternatively, the subscriber may forgo such a re-mailing and simply use the updated addresses for the next successive mailing cycle.

Figure 2:
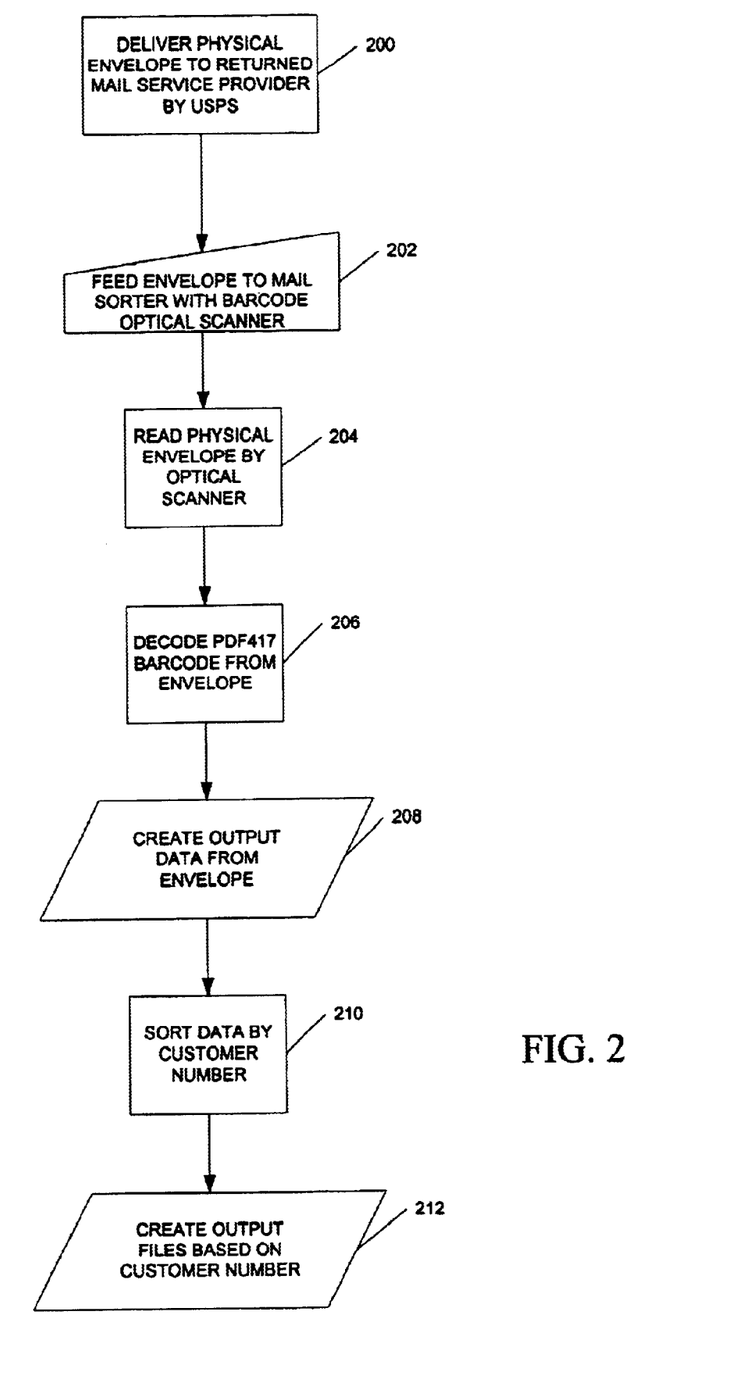
FIG. 2 illustrates the processing logic at the returned mail application servers for handling of mail determined to be undeliverable in accordance with an exemplary embodiment of the present invention.
Figure 3:
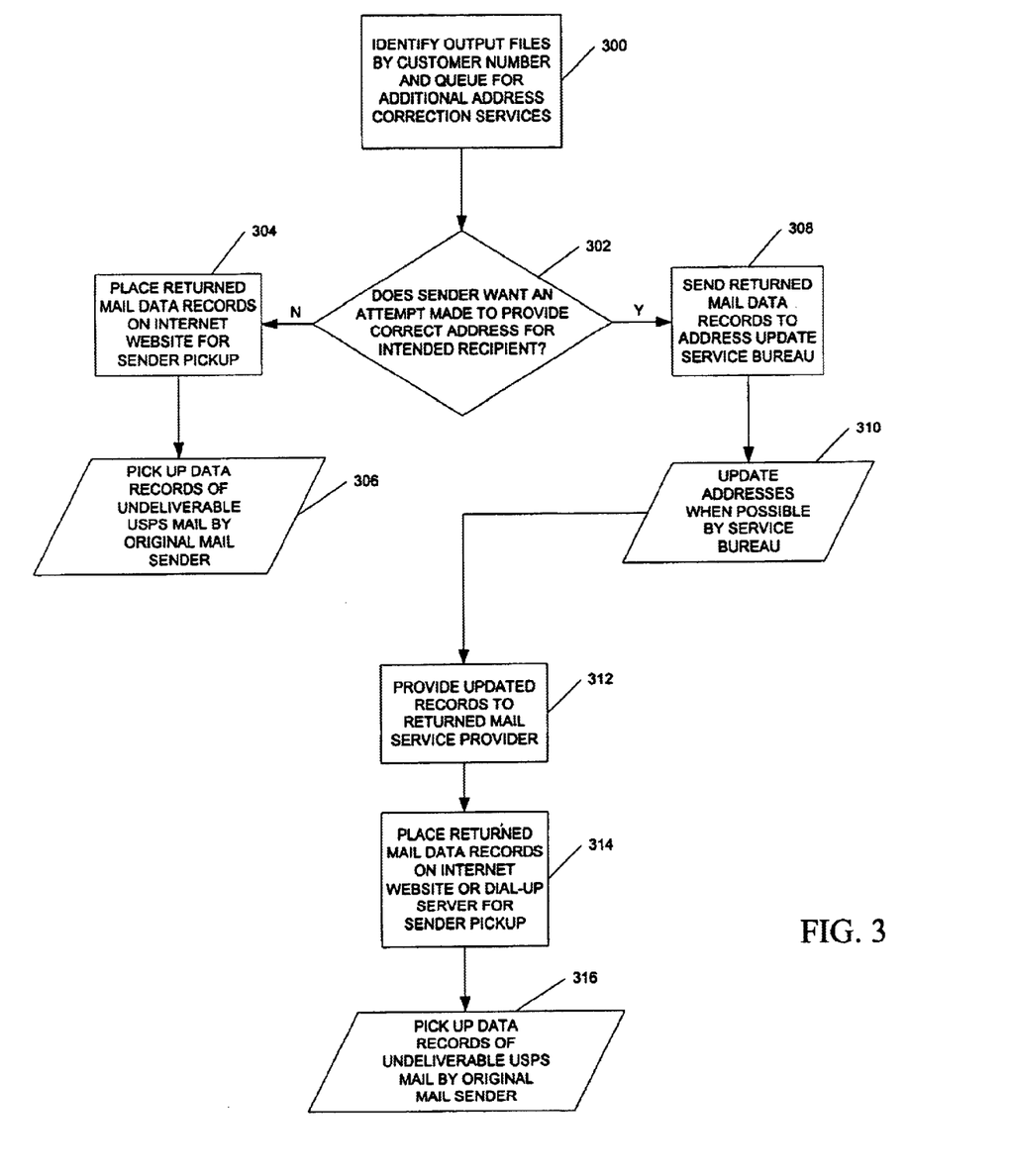
FIG. 3 illustrates the processing logic for updating address records associated with returned mail in accordance with an exemplary embodiment of the present invention.
Figure 4:
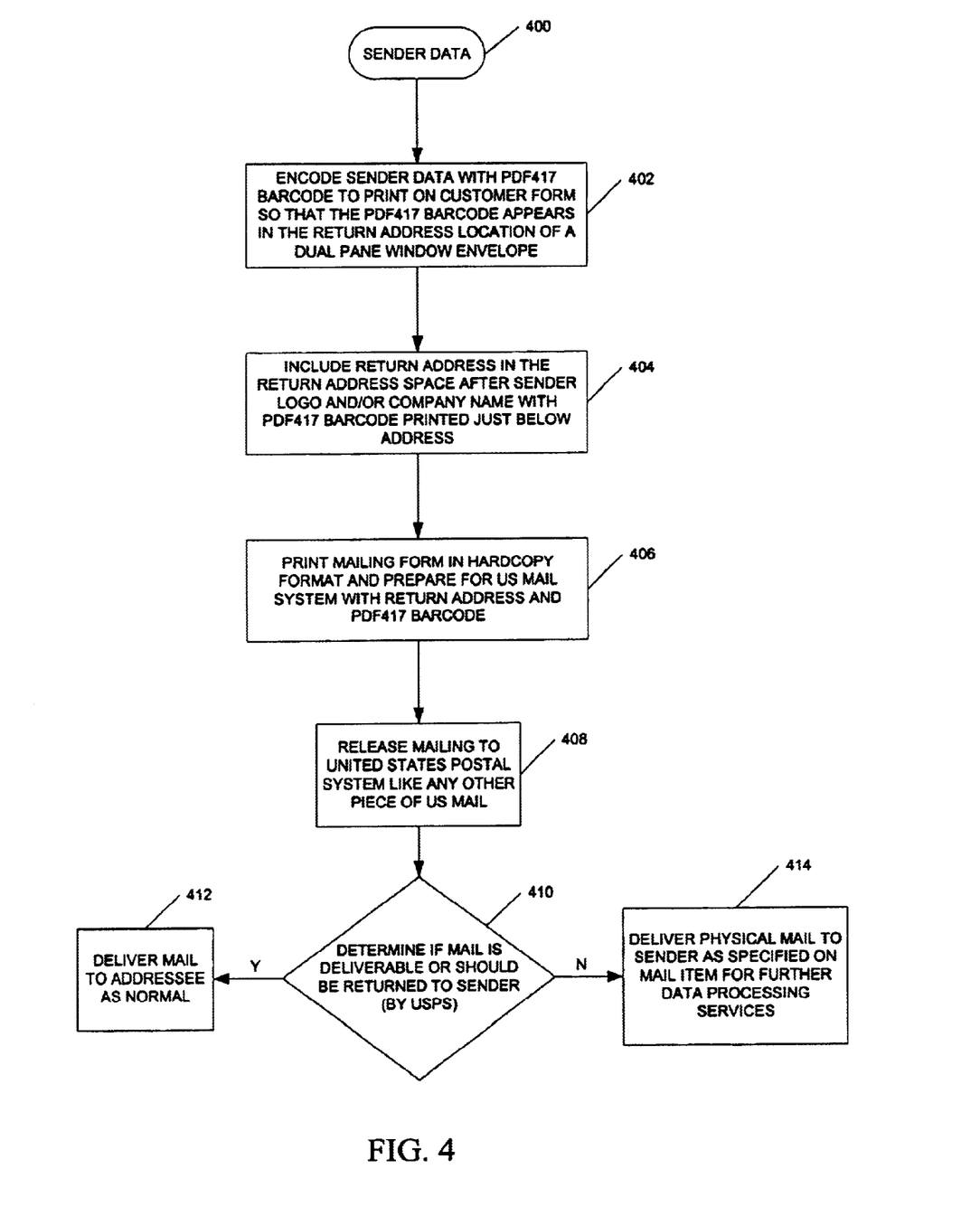
FIG. 4 illustrates the processing logic associated with encoding a subscriber's mailing form with the return address of the returned mail service provider in accordance with an exemplary embodiment of the present invention.

FIG. 2 illustrates the processing logic performed at the returned mail application servers 50 for the handling of mail determined to be undeliverable. Processing starts in logic block 200 with the delivery of the physical envelopes to the return mail service provider from the United States Postal Service. The undeliverable mail is then fed through the mail sorter 20 with barcode optical scanner 40, as indicated in input block 202. The optical scanner 40 then reads the machine-readable information on each envelope as indicated in logic block 204. The two-dimentional barcode is then decoded from each envelope as indicated in logic block 206. Data contained on the envelope is collected and an output data file is created in output block 208. The data in this output file is then sorted by customer numbers, as indicated in logic block 210. From this sorted data, output files are created based on the customer number as indicated in output FIG. 3 illustrates the processing logic for updating address records associated with returned mail. Processing starts as indicated in logic block 300 with the identification of output files by customer number and the queuing of the output files for additional address correction services. In decision block 302, a test is made to determine if the sender (originator) wants the return mail application service provider to provide corrected addresses for intended recipients. If the sender does not want to have correct addresses provided for the intended recipients, the returned mail data records are placed on the Internet website of the service provider for pickup by the sender (logic block 304). As indicated in output block 306, the original mail sender picks up the data records of the undeliverable USPS mail. If a determination is made in decision block 302 that the sender wants to have correct addresses provided for the intended recipients, then the return mail application server then sends the returned mail data records to an address update service bureau, such as the USPS NCOA address correction databases or the databases provided by licensed service providers. This processing step is indicated in logic block 308. The addresses of the intended recipients are then updated when possible based on information provided by the service bureau as indicated in output block 310. The updated records are provided to the return mail service provider as indicated in logic block 312. The returned mail data records are then placed on the Internet website of the service provider or a dialup service for sender pickup as indicated in logic block 314. The original mail sender then picks up the data records of the undeliverable USPS mail as indicated in output block 316. An alternative embodiment of the invention is illustrated in FIG. 4 in which the return mail application service provider encodes a subscriber's mailing form with the return address of the return mail service provider. Processing starts as indicated in block 400 with sender data being received by the return mail application service provider. The sender data is then encoded with a two-dimensional barcode to be printed on a customer form so that the two-dimensional barcode appears in the return address location of a dual pane window envelope as indicated in logic block 402. The return address of the sender is included in the return address space after the sender's logo and/or company name with the two-dimensional barcode printed just below the return address as indicated in logic block 404. The form to be mailed is then printed in hard copy format and prepared for the U.S. postal system with the return address and two-dimensional barcode included on the form as indicated logic block 406. The mailing is then released to the U.S. postal system, like any other piece of U.S. mail, as indicated in logic block 408. Next, in decision block 410, a determination is made if the mail is deliverable or should be returned to the sender from the United States Postal Service. As indicated in logic block 412, deliverable mail is then physically delivered to the addressee as normal. For undeliverable mail, the physical mail is then delivered to the sender as specified on the mail item for further data processing as indicated in logic block 414.

Figure 5:
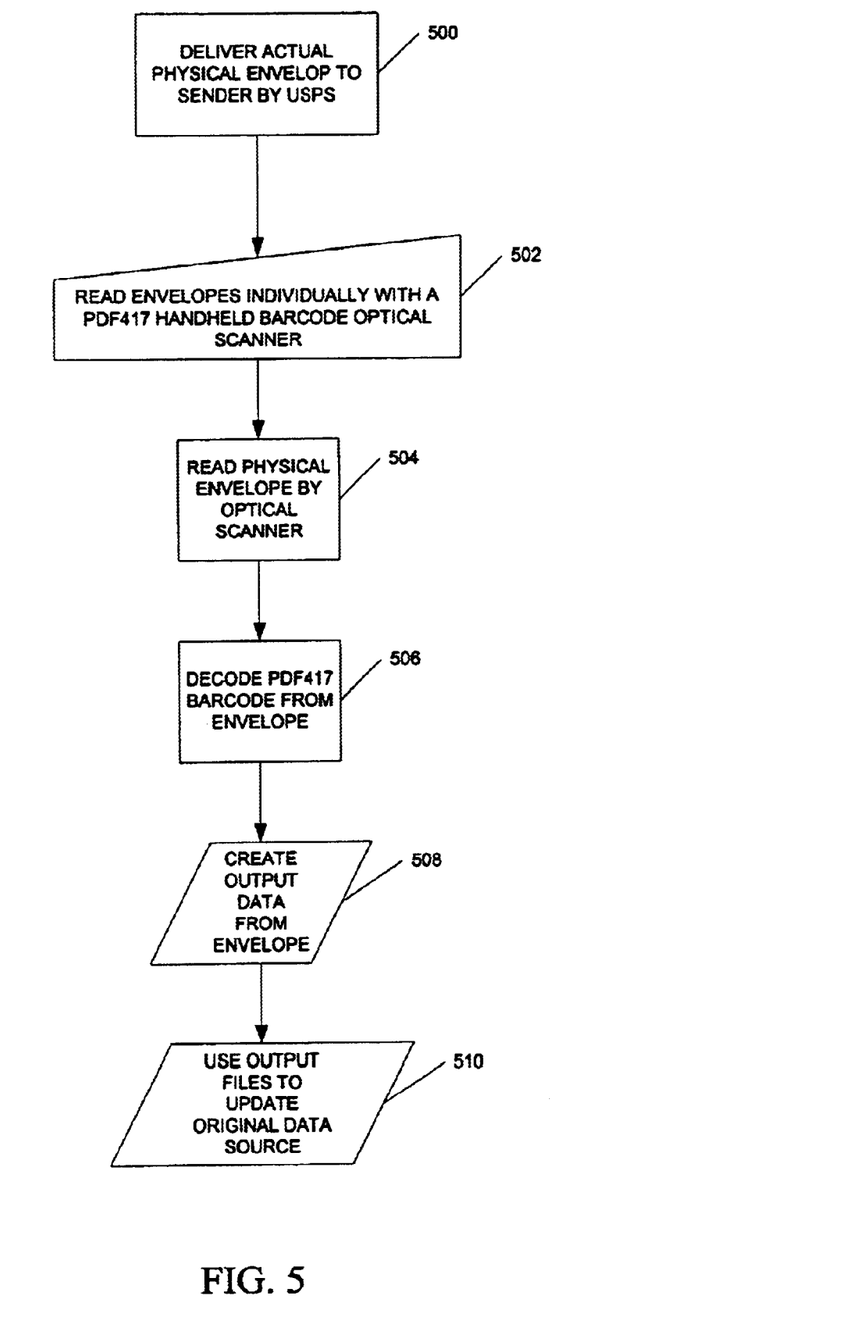
FIG. 5 illustrates the processing logic for updating customer records by a subscriber associated with returned mail in accordance with an exemplary embodiment of the present invention.

FIG. 5 illustrates the processing logic for updating customer records by a subscriber that originated the returned mail. Processing begins in logic block 500 with the delivery of the actual physical envelopes found to be undeliverable by the United States Postal Service to the sender. The envelopes are individually read with a two-dimensional hand-held barcode optical scanner as indicated in input block 502. The optical scanner reads the physical envelope as indicated in logic block 504. Next, as indicated in logic block 506, the two-dimensional barcode on the envelope is decoded. An output file is then created from the decoded envelopes as indicated in output block 508. The output file so generated is then used to update the original data source as indicated in output block 510.

The requirements for an automated system to aid in data capture (and outcome-based sorting) of returned mail items includes the following components, which are available from Lockheed Martin Distribution Technologies, Inc:

1. a standard letter mail transport;
2. a camera subsystem to read the PDF417 2-D barcode. Hardware and process software in this device are derived from a standard mixed media optical character recognition (MLOCR) camera configuration. Recognition software is integrated to read a PDF417 format two-dimensional barcode printed as a portion of the return address block.
3. an application specific sort program to coordinate camera and transport processes.

When the return mail service provider receives the returned mail as undeliverable items from the USPS (from a mixture of subscriber mailings), the letters are faced and passed through the transport mechanism. The camera system attempts to read the two-dimensional barcode as the item passes. The possible outcomes of this operation are:

1. no two-dimensional barcode is located on the envelope—such items are either improperly faced in the transport or are not bar-coded;
2. a two-dimensional barcode is found, but cannot be decoded—such items could have been printed at a non-compliant quality level or marred/damaged during transit through the USPS system, or could simply be "chance" failures in the recognition process;
3. a two-dimensional barcode is found and successfully decoded. Physical sorting of the mail and the recording of envelope data depends on the read outcome. Rejected mail can be selectively routed to different reject bins depending on the two different reject types (i.e., no code found or code cannot be determined). No data is saved for rejected items. Data records for successfully decoded items are saved for later retrieval with the items themselves routed to a successful read bin. Data records are saved in a date/time-stamp file corresponding to the time of run-initialization. At any time, the operator may momentarily end processing, causing this file to be closed and become network accessible for the return mail service provider data processing operations. On processing restart, a new and newly named data file is opened with new envelope data records saved to this file. The data content of the 2-D barcode can be four to seven lines as follows:

1. one alphanumeric string (20–60 characters);
2. three to six lines of address information (maximum of 40 characters per line); and
3. a total maximum of 300 characters (including non-printing characters).

An output file is created for each mail run, with run beginning and end defined by operator action at the sort computer user interface. The name for each output file incorporates a date/time relative to the time of run initialization. The output file contains records only for successfully read 2-D Codes. A vertical bar marks the beginning and end of each record in the file. Another record delimiting character can be specified instead of the vertical bar. However, care must be taken to ensure that it is not a possible character within the barcode data. Between the pair of vertical bars is the continuous byte string returned by the 2-D barcode decode process. Thus, the content and parsing structure of the printed code are transparent to recognition and output processes with line interpretation/parsing governed by embedded line delimiters (such as CR/LF).

Accordingly, it will be appreciated that an improved method of processing returned mail is now provided that addresses the shortcomings of historical manual updating methods and does so at a substantially reduced cost. A high volume mail user subscriber need no longer retain large staffs for manually receiving, researching, updating, and re-mailing pieces of mail that are returned undeliverable. The methodology of the present invention, instead of being virtually all manual, is accomplished virtually entirely automatically through the exchange of data files between computers. Thus, not only is the necessity for the physical handling of large volumes of physical envelopes eliminated for subscribers, the address file updating process can be accomplished much quicker than is possible with manual processing. The likelihood of human error in researching and updating addresses is eliminated with the result that a more reliable and constantly updated address database may be maintained.

The returned mail handling system of the present invention can be realized in software or a combination of hardware and software. Any kind of computer system or other apparatus adapted for carrying out the methods described herein is suited. A typical combination of hardware and software in this context could be a web-based server computer with a computer program that, when loaded and executed, controls the web-based server computer such that it carries out the methods described herein. The returned mail handling system can be embedded in a computer program product, which includes all the features enabling the implementation of the methods described herein, and which, when loaded in a computer system, is able to carry out these methods.

Additionally, the corresponding structures, materials, acts, and equivalents of all means plus function elements in any claims are intended to include any structure, material or acts for performing the functions in combination with other claim elements as specifically claimed.

Those skilled in the art will appreciate that many modifications to the exemplary embodiment of the present invention are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in imitation thereof since the scope of the present invention is defined solely by the appended claims.

What is claimed is:

1. A method for processing a plurality of undeliverable mail items comprising the steps of:
    encoding data including intended recipient identification information on each of a plurality of mail items prior to mailing;
    receiving those items of the plurality of mail items that are returned as being undeliverable;
    scanning and decoding the encoded data on the items of undeliverable mail to identify intended recipients having incorrect addresses; and
    electronically transferring to the sender information for the identified intended recipients for the sender to update the sender's mailing address files.

2. The method for processing a plurality of undeliverable mail items of claim 1, further comprising the steps of:
    storing the decoded data in a data file;
    updating the stored data to correct the address of each intended recipient of the items of undeliverable mail; and
    delivering the updated data to a subscriber electronically for use in updating the mailing address files of the subscriber.

3. The method for processing a plurality of undeliverable mail items of claim 1, wherein the recipient identification information encoded on each mail item includes a name and an address associated with an intended recipient of the mail item.

4. The method for processing a plurality of undeliverable mail items of claim 1 further comprising the step of loading the plurality of undeliverable mail items on a transport mechanism for sorting into a plurality of categories.

5. The method for processing a plurality of undeliverable mail items of claim 4 wherein the plurality of categories includes a barcode not decoded category and a barcode decoded successfully category.

6. The method for processing a plurality of undeliverable mail items of claim 1 wherein the step of scanning the encoded data on the undeliverable mail includes reading an optically encoded barcode on each item and decoding the barcode to determine the intended recipient identification information associated with an intended recipient of the item.

7. The method for processing a plurality of undeliverable mail items of claim 6 further comprising the step of generating an output file of the identified intended recipients from the scanned and decoded data in the optically encoded barcode.

8. The method for processing a plurality of undeliverable mail items of claim 7 further comprising the step of transmitting the generated output file to a mailing address service provider in order to obtain an updated address for each intended recipient of an undeliverable mail item.

9. The method for processing a plurality of undeliverable mail items of claim 1 wherein the step of encoding data includes placing an optically encoded barcode on each of the plurality of mail items.

10. The method for processing a plurality of undeliverable mail items of claim 9, wherein the optically encoded bar code is placed on either the front side or the back side of each mail item.

11. The method for processing a plurality of undeliverable mail items of claim 9, wherein the optically encoded bar code is placed in a return address section on each of the plurality of mail items.

12. The method for processing a plurality of undeliverable mail items of claim 9 wherein the barcode is a two-dimensional barcode.

13. The method for processing a plurality of undeliverable mail items of claim 12 wherein the two-dimensional barcode is a Portable Data File 417 (PDF417) barcode.

14. A method for processing returned mail items sent by a subscriber to a recipient, the returned mail items incorporating encoded intended recipient identification information, the method comprising the steps of:
    collecting the returned mail items at a processing location;
    reading the encoded intended recipient identification information from the returned mail items to identify intended recipients having incorrect addresses;
    electronically gathering updated recipient identification information including a different an updated address of the intended recipient; and
    electronically transmitting updated recipient identification information to the subscriber for updating of a subscriber's address database.

15. The method for processing returned mail items of claim 14 further comprising the step of loading the plurality of undeliverable mail items on a transport mechanism for sorting into a plurality of categories.

16. The method for processing returned mail items of claim 15 wherein the plurality of categories includes a barcode not decoded category and a barcode decoded successfully category.

17. The method for processing returned mail items of claim 14 wherein the step of reading the encoded information includes scanning an optically encoded barcode on each item and decoding the barcode to determine identification information associated with the intended recipient of the item.

18. The method for processing returned mail items of claim 17 further comprising the step of generating an output file of the identified intended recipients from the scanned and decoded data in the optically encoded barcode.

19. The method for processing returned mail items of claim 18 further comprising the step of transmitting the generated output file to a mailing address service provider in order to obtain an updated a address for each intended recipient of an undeliverable mail item.

20. The method for processing returned mail items of claim 14 wherein the encoded information is placed in an optically encoded barcode on each of the plurality of mail items.

21. The method for processing a plurality of undeliverable mail items of claim 20, wherein the optically encoded bar code is placed on either the front side or the back side of each mail item.

22. The method for processing a plurality of undeliverable mail items of claim 20, wherein the optically encoded bar code is placed in a return address section on each of the plurality of mail items.

23. The method for processing returned mail items of claim 20 wherein the barcode is a two-dimensional barcode.

24. The method for processing returned mail items of claim 23 wherein the two-dimensional barcode is a Portable Data File 417 (PDF417) barcode.

25. A computer readable medium containing a computer program product comprising instructions for controlling a computer system to process a plurality of undeliverable mail items, the computer program product comprising:

program instructions that capture optically scanned encoded data including intended recipient identification information on each item of undeliverable mail and identify intended recipients having incorrect addresses;

program instructions that store the captured and identified intended recipient data in a data file;

program instructions that update the stored data to incorporate an updated address of the intended recipient of each item of undeliverable mail; and     program instructions that transmit the updated intended recipient address information to a subscriber electronically to update the address files of the subscriber.

26. The computer program product for controlling a computer system to process a plurality of undeliverable mail items of claim 25 wherein the encoded identification information includes a name and current address associated with the intended recipient of the mail item.

27. The computer program product for controlling a computer system to process a plurality of undeliverable mail items of claim 25 further comprising program instructions that transmit the stored data file electronically to a mailing address service provider in order to obtain an updated address for each intended recipient of an undeliverable mail item.

28. The computer program product for controlling a computer system to process a plurality of undeliverable mail items of claim 25 wherein the encoded data is placed in an optically encoded barcode on each mail item.

29. The computer program product for controlling a computer system process a plurality of undeliverable mail items of claim 28 wherein the bar code is a two-dimensional bar code.

30. The computer program product for controlling a computer system to process a plurality of undeliverable mail items of claim 28, wherein the optically encoded bar code is placed on either the front side or the back side of each mail item.

31. The computer program product for controlling a computer system to process a plurality of undeliverable mail items of claim 28, wherein the optically encoded bar code is placed in a return address section on each of the plurality of mail items.

32. A system for processing a plurality of undeliverable mail items comprising:

a scanner for reading optically encoded data that includes intended recipient identification information on each item of undeliverable mail;

a processor for operation of a computer program for decoding the scanned data, identifying the intended recipient identification information in the decoded data, writing the identified recipient identification information into a data file, and transferring to a sender information for the identified intended recipient for the sender to update the sender's mailing address files; and     a database for storing the data file containing identified recipient identification information.

33. The system for processing a plurality of undeliverable mail items of claim 32 wherein the optically encoded data contains a two-dimensional bar code.

34. The system for processing a plurality of undeliverable mail items of claim 32, further comprising a mail transport device for conveying the plurality of undeliverable items and sorting the undeliverable mail items into a plurality of bins.

35. The system for processing a plurality of undeliverable mail items of claim 32, wherein the scanner is a hand-held device.

36. The system for processing a plurality of undeliverable mail items of claim 32, wherein the scanner is a mixed media optical character recognition (MLOCR) device.

37. The system for processing a plurality of undeliverable mail items of claim 32 wherein the computer program includes instructions that update the stored data in the data file with an updated address associated with each of the intended recipients of the undeliverable mail items.

38. The system for processing a plurality of undeliverable mail items of claim 37 wherein the computer program includes instructions that deliver the updated address data to a subscriber in electronic form for use in updating the address files for the intended recipients.

* * * * *

UNITED STATES PATENT AND TRADEMARK OFFICE
CERTIFICATE OF CORRECTION

PATENT NO. : 6,826,548 B2
DATED : November 30, 2004
INVENTOR(S) : Return Mail, Inc.

It is certified that error appears in the above-identified patent and that said Letters Patent is hereby corrected as shown below:

Column 7,
Line 39, after "mail items" insert -- from a sender --.

Column 8,
Line 49, delete "a different".

Column 9,
Line 8, delete "a".

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,826,548 C1
APPLICATION NO. : 90/008470
DATED : January 4, 2011
INVENTOR(S) : Ralph M. Hungerpiller et al.

Page 1 of 1

It is certified that error appears in the above-identified patent and that said Letters Patent is hereby corrected as shown below:

On the Ex Parte Reexamination Certificate Title page, Item (60), under Related U.S. Application Data, delete "Feb." and insert --Jan.-- therefor.

Signed and Sealed this
Seventeenth Day of April, 2012

David J. Kappos
*Director of the United States Patent and Trademark Office*

US006826548C1

(12) EX PARTE REEXAMINATION CERTIFICATE (7964th)
United States Patent
Hungerpiller et al.

(10) Number: US 6,826,548 C1
(45) Certificate Issued: Jan. 4, 2011

(54) SYSTEM AND METHOD FOR PROCESSING RETURNED MAIL (75) Inventors: Ralph Mitchell Hungerpiller, Birmingham, AL (US); Ronald C. Cagle, Birmingham, AL (US)

(73) Assignee: Return Mail, Inc., Birmingham, AL (US)

Reexamination Request:
No. 90/008,470, Jan. 31, 2007

Reexamination Certificate for:
Patent No.: 6,826,548
Issued: Nov. 30, 2004
Appl. No.: 10/057,608
Filed: Jan. 24, 2002

Certificate of Correction issued Apr. 26, 2005.

Related U.S. Application Data (60) Provisional application No. 60/263,788, filed on Feb. 24, 2001.

(51) Int. Cl.
*B07C 3/00* (2006.01)
*B07C 3/18* (2006.01)
*G06Q 10/00* (2006.01)

(52) U.S. Cl. .................................. 705/401; 382/101
(58) Field of Classification Search ...................... None
See application file for complete search history.

(56) References Cited

U.S. PATENT DOCUMENTS

| | | |
|---|---|---|
| 4,796,196 A | 1/1989 | Durst, Jr. et al. |
| 4,800,505 A | 1/1989 | Axelrod et al. |
| 4,831,555 A | 5/1989 | Sansone et al. |
| 4,979,605 A | 12/1990 | Svyatsky |
| 5,005,124 A | 4/1991 | Connell et al. |
| 5,079,714 A | 1/1992 | Manduley et al. |
| 5,161,109 A | 11/1992 | Keating et al. |
| 5,229,932 A | 7/1993 | Connell et al. |
| 5,319,181 A | 6/1994 | Shellhammer et al. |
| 5,420,403 A | 5/1995 | Allum et al. |
| 5,422,821 A * | 6/1995 | Allen et al. .................. 700/219 |
| 5,470,427 A | 11/1995 | Mikel et al. |
| 5,514,863 A | 5/1996 | Williams |
| 5,612,889 A * | 3/1997 | Pintsov et al. ............... 700/226 |
| 5,682,429 A * | 10/1997 | Cordery et al. ............... 705/60 |
| 5,703,783 A | 12/1997 | Allen et al. |

(Continued)

FOREIGN PATENT DOCUMENTS

| | | |
|---|---|---|
| EP | 0 673 686 A1 | 9/1995 |
| EP | 1 022 691 A2 | 7/2000 |
| JP | 7-171505 A | 7/1995 |
| JP | 2000-334389 A | 12/2000 |
| KR | 2001-0064264 | 7/2001 |
| WO | WO 00/10113 A1 | 2/2000 |

OTHER PUBLICATIONS

Postal Addressing Standards—Publication 28, Nov. 2000, pp. 129.*

(Continued)

*Primary Examiner*—Lynne H Browne (57) ABSTRACT

A method, system and program product for processing returned mail includes the steps of encoding pieces of mail with data including the identity of the intended recipient, mailing the pieces of mail to the intended recipients, collecting at a processing location those pieces of mail that are returned as undeliverable, scanning the data from the returned pieces of mail, electronically updating at least address information for the intended recipients of the returned mail, and electronically transmitting the updated address and other information to a subscriber for updating the subscriber's database of recipient addresses.

At the time of issuance and publication of this certificate, the patent remains subject to pending reissue application number 11/605,488 filed Nov. 29, 2006. The claim content of the patent may be subsequently revised in the reissue processing.

U.S. PATENT DOCUMENTS

| | | | | |
|---|---|---|---|---|
| 5,731,574 | A | * | 3/1998 | Bodie et al. ................. 235/375 |
| 5,770,841 | A | | 6/1998 | Moed et al. |
| 5,781,634 | A | * | 7/1998 | Cordery et al. ............... 705/60 |
| 5,790,429 | A | | 8/1998 | Baker et al. |
| 5,862,243 | A | | 1/1999 | Baker et al. |
| 5,871,288 | A | | 2/1999 | Ryan, Jr. et al. |
| 5,925,864 | A | | 7/1999 | Sansone et al. |
| 5,930,796 | A | | 7/1999 | Pierce et al. |
| 5,953,427 | A | * | 9/1999 | Cordery et al. ............... 380/51 |
| 5,984,174 | A | | 11/1999 | Kato et al. |
| 6,032,138 | A | | 2/2000 | McFiggans et al. |
| 6,055,520 | A | | 4/2000 | Heiden et al. |
| 6,125,357 | A | | 9/2000 | Pintsov |
| 6,131,101 | A | | 10/2000 | Maitino et al. |
| 6,175,827 | B1 | | 1/2001 | Cordery et al. |
| 6,178,411 | B1 | | 1/2001 | Reiter |
| 6,178,412 | B1 | | 1/2001 | Ratzenberger, Jr. et al. |
| 6,253,219 | B1 | | 6/2001 | Gardner et al. |
| 6,269,344 | B1 | | 7/2001 | Junger |
| 6,292,709 | B1 | | 9/2001 | Uhl et al. |
| 6,311,104 | B1 | | 10/2001 | Shea et al. |
| 6,370,446 | B1 | | 4/2002 | Divine et al. |
| 6,371,521 | B1 | * | 4/2002 | Petkovsek .................... 283/67 |
| 6,385,504 | B1 | | 5/2002 | Pintsov et al. |
| 6,457,012 | B1 | * | 9/2002 | Jatkowski ................... 707/101 |
| 6,532,452 | B1 | | 3/2003 | Pintsov et al. |
| 6,536,659 | B1 | | 3/2003 | Hauser et al. |
| 6,549,892 | B1 | | 4/2003 | Sansone |
| 6,557,000 | B1 | | 4/2003 | Seestrom et al. |
| 6,680,783 | B1 | * | 1/2004 | Pierce et al. ............... 358/1.14 |
| 6,741,724 | B1 | * | 5/2004 | Bruce et al. ................. 382/101 |
| 6,865,561 | B1 | | 3/2005 | Allport et al. |
| 7,647,231 | B2 | * | 1/2010 | Kuebert et al. ................. 705/1 |
| 2001/0010334 | A1 | | 8/2001 | Park et al. |
| 2002/0029202 | A1 | | 3/2002 | Lopez |
| 2002/0147731 | A1 | | 10/2002 | Seestrom et al. |

OTHER PUBLICATIONS

United States Postal Service, Address Change Service, Publication 8, Jul. 1997.

United States Postal Service, Domestic Mail Manual DMM53, Jan. 1, 1998.

United States Postal Service, Volumes, Characteristics, and Costs of Processing Undeliverable–As–Addressed Mail (Sep. 10, 1999).

Business Wire, "Pitney Bowes: Pitney Bowes Addressright system allows companies to make best impression and save money through the mail," May 1, 1992.

George, Tischelle, Fossil to Launch Online Return Process, InformationWeek (Aug. 4, 2000) at http://www.informationweek.com/story/showArticle.jhtml?articleID=6509470 (Sep. 20, 2006).

Tygar, J.D. et al., Crytographic Postage Indicia, Asian Computing Science Conference, 378–391 (1996) at http://www.cs.ucsd.edu/~bsy/pub/asian–96.ps.

United States Postal Service, Address Change Service, publication 8 (Jul. 1997).

United States Postal Service, Address Change Service, Publication 8 (Sep. 1998).

United States Postal Service, DMM53 Domestic Mail Manual (excerpts) (Jan. 1, 1998).

United States Postal Service, Fiscal Year Closing Guidance, Postal Bulletin 22004 (Aug. 12, 1999).

United States Postal Service, Holiday Publicity Kit for Postmasters, Postal Bulletin 21984 (Nov. 5, 1998).

United States Postal Service, Information–Based Indicia Program (IBIP), Performance Criteria for Information–Based Indicia and Security Architecture for Open IBI Postage Evidencing Systems (PCIBI–O) (Feb. 23, 2000).

International Search Report issued on Aug. 13, 2003 in corresponding International Application No. PCT/US03/01177.

Written Opinion issued on Sep. 30, 2003 in corresponding International Application No. PCT/US03/01177.

International Preliminary Examination Report issued on May 18, 2004 in corresponding International Application No. PCT/US03/01177.

Examination Report issued on Oct. 1, 2004 in corresponding New Zealand Application No. 534843.

Notice of Opposition to Grant of Application filed on Jul. 17, 2006 in corresponding New Zealand Application No. 534843.

Opponent's Statement of Case filed on Aug. 21, 2006 in corresponding New Zealand Application No. 534843.

Supplemental European Search Report issued on Feb. 28, 2006 in corresponding European Application No. 03705775.9.

Examination Report issued on Mar. 15, 2007 in corresponding European Application No. 03705775.9.

Examination Report issued on Jul. 4, 2006 in corresponding Australian Application No. 2003207564.

Letter from the U.S. Postal Service addressed to Locaters International, Inc. dated Oct. 1, 1982.

Letters from the U.S. Postal Service dated Jul. 16, 1990.

Letter from the U.S. Postal Service address to Sim & Henry dated Jun. 16, 1982.

Letter from the U.S. Postal Service dated Nov. 3, 1982.

U.S. Postal Service Management Instruction "Furnishing Address Changes to Election Boards and Voter Registration Commissions," issued Jan. 31, 1989.

House Report No. 102–1086, Part 2, pp. 1–9 (1992).

The Federal Register, vol. 65, No. 99, pp. 32136–38, dated May 22, 2000.

Privacy Act Systems of Records, Jul. 1999, pp. 391–392.

Privacy Act Systems of Records—Appendix, Jul. 1999, pp. 379–381.

The Federal Register, vol. 67, No. 241, pp. 77097–98 and 77089–90, dated Dec. 16, 2002.

The Federal Register, vol. 67, No. 105, pp. 38041–43, dated May 31, 2002.

The Federal Register, vol. 54, No. 206, pp. 43657–58, dated Oct. 26, 1989.

U.S. General Accounting Office: Report to Congressional Requesters. "U.S. Postal Service: Improved Oversight Needed to Protect Privacy of Address Changes," Aug. 13, 1996, pp.1–29.

Document 1—Compliant for Declaratory Judgment of Invalidity and Unenforceability of Patent, filed Mar. 11, 2005 in Case No. 2:05CV70956. pp. 1–45.

Document 2—Statement of Disclosure of Corporate Affiliations and Financial Interest, filed Mar. 11, 2005 in Case No. 2:05CV70956.

Document 3—Report on the Filing or Determination of an Action Regarding a Patent or Trademark, filed Mar. 14, 2005 in Case No. 2:05CV70956. pp. 1–2.

Document 4—Plaintiff's Motion to Dismiss, filed Jun. 23, 2005 in Case No. 2:05CV70956.

Document 5—Order Dismissing Case Without Prejudice, filed Jun. 28, 2005 in Case No. 2:05CV70956.

United States Postal Service, Postal Bulletin, PB 22042, Jan. 25, 2001, pp. 1–112.
United States Postal Service, Postal Bulletin, PB 22083, Aug. 22, 2002, pp. 1–80.
United States Postal Service, Postal Bulletin, PB 21993, Mar. 11, 1999, pp. 1–88.
United States Postal Service, Postal Bulletin, PB 22038, Nov. 30, 2000, pp. 1–176.
United States Postal Service, Confirmation Services Technical Guide, Publication 91, May 2008, pp. 1–104.
Mailpiece Quality Control (MQC) Program–Contents, Self–Study Guide Modules, Sep. 2007, Modules 1–10 and Appendix A.
United States Postal Service, National Customer Support Center, ACS Service, http://ribbs.usps.gov/index.cfm?page=acs; pp. 1–2.
United States Postal Service, DMM 507 Mailer Services, http://pe.usps.com/text/dmm300/507.htm#wp1223780; pp. 1–80.
United States Postal Service, Postal Bulletin, PB 21934, Dec. 5, 1996, pp. 1–56.
Address Change Service Application, Address Change Service Department, National Address Information Center.
Letter from U. S. Postal Services addressed to Honorable Thomas C. Sawyer, Nov. 24, 1993.
Letter from U.S. House of Representatives addressed to Honorable Marvin Runyon, Oct. 5, 1993.
Letter from U.S. Postal Service addressed to Managers, Sales (Area), Dec. 20, 1994.
Letter from U.S. Postal Service, Customer and Automation Service Department, Aug. 28, 1991.
Letter from U.S. Postal Service, National Customer Support Center, Aug. 8, 1996.
Postal Automated Redirection System—The USPS Solution, 13th International Conference on Postal Automation, May 23–28, 1999.
The Federal Register, vol. 62, No. 60, pp. 15055–15065, Mar. 28, 1997.
United States Postal Service, Your Guide to Address Change Services, pp. 1–25, May 1, 1991.
United States Postal Service, Address Change Service, Addendum to Publication 8 Address Change Service, Publication 8, Sep. 1998.
United States Postal Service, Address Change Service, Creative Solutions for Your Business Needs, News Briefs, Publication 8, Jul. 1990.
United States Postal Service, Address Change Service, Third–Class Address Change Service, Sep. 13, 1988.
United States Postal Service, *Draft* Information–Based Indicia Program (IBIP) Performance Criteria for Information–Based Indicia and Security Architecture for Closed IBI Postage Metering Systems (PCIBI–C) Jan. 12, 1999.
United States Postal Service, National Customer Support Center, Move Update, pp. 1–12, Apr. 1997.
United States Postal Service, Postal Bulletin, Second–Generation Address Change Service, PB 21798, Sep. 19, 1991.
United States Postal Service, The Mailroom Companion, vol. 2, No. 2, pp. 1–8, Feb. 1997.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-38 are cancelled.

New claims 39-63 are added and determined to be patentable.

*39. A method for processing returned mail items sent by a sender to an intended recipient, the method comprising:*
  *decoding, subsequent to mailing of the returned mail items, information indicating whether the sender wants a corrected address to be provided for the intended recipient, on at least one of the returned mail items;*
  *obtaining an updated address of the intended recipient subsequent to determining that the sender wants a corrected address to be provided for the intended recipient; and*
  *electronically transmitting an updated address of the intended recipient to a transferee, wherein the transferee is a return mail service provider.*

*40. A computer program product residing on a computer readable medium comprising instructions for causing a computer to:*
  *store decoded information indicating whether a sender wants a corrected address to be provided and a customer number, each associated with at least one of a plurality of mail items returned subsequent to mailing as being undeliverable;*
  *determining from the decoded data that the customer wants a corrected address to be provided for at least one of the plurality of undeliverable mail items;*
  *receive an updated address of an intended recipient for at least one of the plurality of undeliverable mail items, subsequent to and based upon the determining step; and*
  *transmit the updated address to a transferee, wherein the transferee is a return mail service provider.*

*41. A system for processing a plurality of undeliverable mail items comprising:*
  *a first detector, wherein the first detector detects, subsequent to mailing the undeliverable mail items, encoded information on at least one of the plurality of undeliverable mail items indicating whether a sender wants a corrected address to be provided for at least one of the undeliverable mail items; and*
  *a processor that uses a computer program comprising instructions that cause the system to: i) decode the information indicating whether the sender wants a corrected address to be provided; ii) encode and decode intended recipient identification information; and iii) enable an updated address of an intended recipient to be sent to a transferee, wherein the transferee is a return mail service provider.*

*42. A method for processing a plurality of undeliverable mail items, comprising:*
  *receiving from a sender a plurality of mail items, each including i) a written addressee, and ii) encoded data indicating whether the sender wants a corrected address to be provided for the addressee;*
  *identifying, as undeliverable mail items, mail items of the plurality of mail items that are returned subsequent to mailing as undeliverable;*
  *decoding the encoded data incorporated in at least one of the undeliverable mail items;*
  *creating output data that includes a customer number of the sender and at least a portion of the decoded data;*
  *determining if the sender wants a corrected address provided for intended recipients based on the decoded data;*
  *if the sender wants a corrected address provided, electronically transferring to the sender information for the identified intended recipients that enable the sender to update the sender's mailing address files; and*
  *if the sender does not want a corrected address provided, posting return mail data records on a network that is accessible to the sender to enable the sender to access the records.*

*43. The method of claim 42, further comprising transmitting the name and address of the intended recipients to a mailing address service provider, subsequent to the determining step, in order to obtain an updated address for each intended recipient of an undeliverable mail item.*

*44. The method of claim 42, wherein the encoded data further indicates a name and address of the intended recipient.*

*45. The method of claim 42, wherein the plurality of mail items further include a written return address that is not that address of the sender.*

*46. A method for processing a plurality of undeliverable mail items, comprising:*
  *receiving from a sender a plurality of mail items, each including i) a written addressee, and ii) encoded data indicating whether the sender wants a corrected address to be provided for the addressee;*
  *identifying, as undeliverable mail items, mail items of the plurality of mail items that are returned subsequent to mailing as undeliverable;*
  *decoding the encoded data incorporated in at least one of the undeliverable mail items;*
  *creating output data that includes a customer number of the sender and at least a portion of the decoded data;*
  *determining, based on the decoding step, if the sender wants a corrected address provided for intended recipients;*
  *if the sender wants a corrected address provided, electronically transferring to the sender information for the identified intended recipients that enable the sender to update the sender's mailing address files, including a name change and a job change of intended recipients; and*
  *if the sender does not want a corrected address provided, posting return mail data records on a network that is accessible to the sender to enable the sender to access the records.*

*47. The method of claim 46, further comprising transmitting the name and address of the intended recipients to a mailing address service provider, subsequent to the determining step, in order to obtain an updated address for each intended recipient of an undeliverable mail item.*

48. The method of claim 46, wherein the encoded data further indicates a name and address of the intended recipient.

49. The method of claim 46, wherein the plurality of mail items further include a written return address that is not that address of the sender.

50. A method for processing a plurality of undeliverable mail items, comprising:
   receiving from a sender a plurality of mail items, each including i) a written addressee, and ii) encoded data indicating whether the sender wants a corrected address to be provided for the addressee;
   identifying, as undeliverable mail items, mail items of the plurality of mail items that are returned subsequent to mailing as undeliverable;
   decoding the encoded data incorporated in at least one of the undeliverable mail items;
   creating first output data that includes a customer number of the sender and at least a portion of the decoded data;
   sorting the first output data by customer number, after creating the first output data;
   creating second output data for a customer number that includes the name and address of the intended recipients associated with the customer number, after the sorting step;
   determining if the sender wants a corrected address provided for intended recipients;
   if the sender wants a corrected address provided, electronically transferring to the sender information for the identified intended recipients that enable the sender to update the sender's mailing address files, including a name change and a job change of intended recipients; and
   if the sender does not want a corrected address provided, posting return mail data records on a network that is accessible to the sender to enable the sender to access the records.

51. The method of claim 50, wherein the encoded data further indicates a name and address of the intended recipient.

52. The method of claim 50, wherein the plurality of mail items further include a written return address that is not that address of the sender.

53. The method of claim 50, further comprising transmitting the name and address of the intended recipients to a mailing address service provider in order to obtain an updated address for each intended recipient of an undeliverable mail item.

54. A method for processing a plurality of undeliverable mail items, comprising:
   receiving from a sender a plurality of mail items, each including i) a written addressee, and ii) encoded data indicating whether the sender wants a corrected address to be provided for the addressee;
   identifying, as undeliverable mail items, mail items of the plurality of mail items that are returned subsequent to mailing as undeliverable;
   decoding the encoded data incorporated in at least one of the undeliverable mail items;
   creating first output data that includes a customer number of the sender and at least a portion of the decoded data;
   sorting the content of the first output data by customer number;
   creating second output data that includes a customer number and the name and address of the intended recipients associated with the customer number, after the sorting step;
   determining if the sender wants a corrected address provided for intended recipients based on the decoded data;
   if the sender wants a corrected address provided, i) electronically transmitting the name and address of the intended recipient to an address correction service provider and receiving an updated address of the intended recipient from the address correction service provider; ii) electronically transferring to the sender, subsequent to receiving an updated address of the intended recipient from the address correction service provider, information for the identified recipients that enable the sender to update the sender's mailing address files; and
   if the sender does not want a corrected address provided, posting return mail data records on a network that is accessible to the sender to enable the sender to access the records.

55. The method of claim 54, wherein the encoded data further indicates a name and address of the intended recipient.

56. The method of claim 54, wherein the plurality of mail items further include a written return address that is not that address of the sender.

57. A method for processing a plurality of undeliverable mail items, comprising:
   receiving from a sender a plurality of mail items, each including i) a written addressee, and ii) encoded data indicating whether the sender wants a corrected address to be provided for the addressee;
   identifying, as undeliverable mail items, mail items of the plurality of mail items that are returned subsequent to mailing as undeliverable;
   decoding the encoded data incorporated in at least one of the undeliverable mail items;
   creating first output data that includes a customer number of the sender and at least a portion of the decoded data including the name and address of the intended recipient;
   sorting the content of the first output data by customer number;
   creating second output data for a customer number that includes the name and address of the intended recipients associated with the customer number, after the sorting step;
   determining if the sender wants a corrected address provided for intended recipients based on the decoded data;
   if the sender wants a corrected address provided, i) electronically transmitting the name and address of the intended recipient to an address correction service provider and receiving an updated address of the intended recipient from the address correction service provider; and ii) electronically transferring to the sender, subsequent to receiving an updated address of the intended recipient from the address correction service provider, information for the indentified intended recipients that enable the sender to update the sender's mailing address files; and
   if the sender does not want a corrected address provided, posting return mail data records on a network that is accessible to the sender to enable the sender to access the records.

58. The method of claim 57, wherein the encoded data further indicates a name and address of the intended recipient.

59. The method of claim 57, wherein the plurality of mail items further include a written return address that is not that address of the sender.

60. A system for processing a plurality of undeliverable mail items, comprising:

a letter transport for receiving from a sender a plurality of undeliverable mail items that are returned subsequent to mailing as being undeliverable, each undeliverable mail item including i) a written addressee, and ii) encoded data indicating whether the sender wants a corrected address to be provided for the addressee;

a camera for decoding the encoded data incorporated in at least one of the undeliverable mail items; and a computer for i) creating first output data that includes a customer number of the sender and at least a portion of the decoded data including the name and address of the intended recipient, iii) sorting the content of the first output data by customer number, after creating the first output data; ii) creating second output data for a customer number that includes the name and address of the intended recipients associated with the customer number, after the sorting the content of the output file by customer number; and iv) determining if the sender wants a corrected address provided for intended recipients based on the decoded data;

wherein the computer, upon determining that the sender wants a corrected address provided, i) electronically transmits the name and address of the intended recipient to an address correction service provider and receives and updated address of the intended recipient from the address correction service provider; and ii) electronically transfers to the sender, subsequent to receiving an updated address of the intended recipient from the address correction service provider, information for the identified intended recipients that enable the sender to update the sender's mailing address files; and wherein the computer, upon determining that the sender does not want a corrected address provided, posts return mail data records on a network that is accessible to the sender to enable the sender to access the records.

61. The method of claim 60, wherein the encoded data further indicates a name and address of the intended recipient.

62. The method of claim 60, wherein the plurality of mail items further include a written return address that is not that address of the sender.

63. A system for processing a plurality of undeliverable mail items, comprising:

a hand-held barcode optical scanner for decoding encoded data on undeliverable mail items that are returned subsequent to mailing as being undeliverable, the encoded data indicating whether a sender wants a corrected address to be provided for the addressee incorporated, wherein each undeliverable mail item also includes a written addressee; and a computer for i) creating first output data that includes a customer number of the sender and at least a portion of the decoded data including the name and address of the intended recipient; ii) sorting the content of the first output data by customer number, after creating the first output data; iii) creating second output data for a customer number that includes the name and address of the intended recipients associated with the customer number, after the sorting the content of the output file by customer number; and iv) determining if the sender wants a corrected address provided for intended recipients based on the decoded data;

wherein the computer, upon determining that the sender wants a corrected address provided, i) electronically transmits the name and address of the intended recipient to an address correction service provider and receives an updated address of the intended recipient from the address correction service provider; and ii) electronically transfers to the sender, subsequent to receiving an updated address of the intended recipient from the address correction service provider, information for the identified intended recipients that enable the sender to update the sender's mailing address files; and wherein the computer, upon determining that the sender does not want a corrected address provided, posts return mail data records on a network that is accessible to the sender to enable the sender to access the records.

* * * * *